United States Patent [19]

Hirata

[11] Patent Number: 4,700,387
[45] Date of Patent: Oct. 13, 1987

[54] BROADCAST SYSTEM FOR SCRAMBLED PROGRAMMING SIGNALS

[75] Inventor: Shigeaki Hirata, Yokohama, Japan

[73] Assignee: Kabushiki Kaisha Toshiba, Kawasaki, Japan

[21] Appl. No.: 751,954

[22] Filed: Jul. 5, 1985

[30] Foreign Application Priority Data

Jul. 9, 1984 [JP] Japan .................. 59-140624

[51] Int. Cl.$^4$ ............................................. H04N 7/167
[52] U.S. Cl. ......................................... 380/20; 380/10
[58] Field of Search ..................... 358/122, 123, 114; 178/22.13, 22.15, 22.16

[56] References Cited

U.S. PATENT DOCUMENTS 3,953,677  4/1976  Gannett .
4,484,027  11/1984  Lee et al. ........................ 358/122

FOREIGN PATENT DOCUMENTS 0028273   5/1981  European Pat. Off. .
0100106   2/1984  European Pat. Off. .
AS2058796 8/1978  Fed. Rep. of Germany .
AS2334330 1/1981  Fed. Rep. of Germany .
WO80/01722 8/1980 PCT Int'l Appl. .
WO81/01933 7/1981 PCT Int'l Appl. .
WO84/00457 2/1984 PCT Int'l Appl. .
1379740   1/1975  United Kingdom .
2020513   11/1979 United Kingdom .
2050021   12/1980 United Kingdom .
2068691   8/1981  United Kingdom .
2124856   2/1984  United Kingdom .
2132860   7/1984  United Kingdom .

Primary Examiner—Stephen C. Buczinski
Assistant Examiner—Melissa L. Koltak
Attorney, Agent, or Firm—Cushman, Darby & Cushman

[57] ABSTRACT

A pay program signal is scrambled in an exclusive OR circuit by a scrambling signal (Ks) derived from a random number generator. The pay program signal is converted into a broadcasting signal by a converter. A transmission information processor alters every month, for example, the contents of an initial value signal applied to the random number generator in order to change a scramble mode. The information processor transmits, via the converter, cipher signal (Ei) for descrambling the pay program signal in, for example, the next month. The cipher signal (Ei1) is stored in a RAM of a subscriber. At this time, a memory area into which the cipher signal (Ei1) is to be stored is designated by a distribution page flag (DP) transmitted from the information processor. The information processor also designates the memory area storing the cipher signal (Ei1), by means of a reference page flag (RF), which is to be used. The key data is used as data to determine a descramble mode of the random number generator.

10 Claims, 5 Drawing Figures

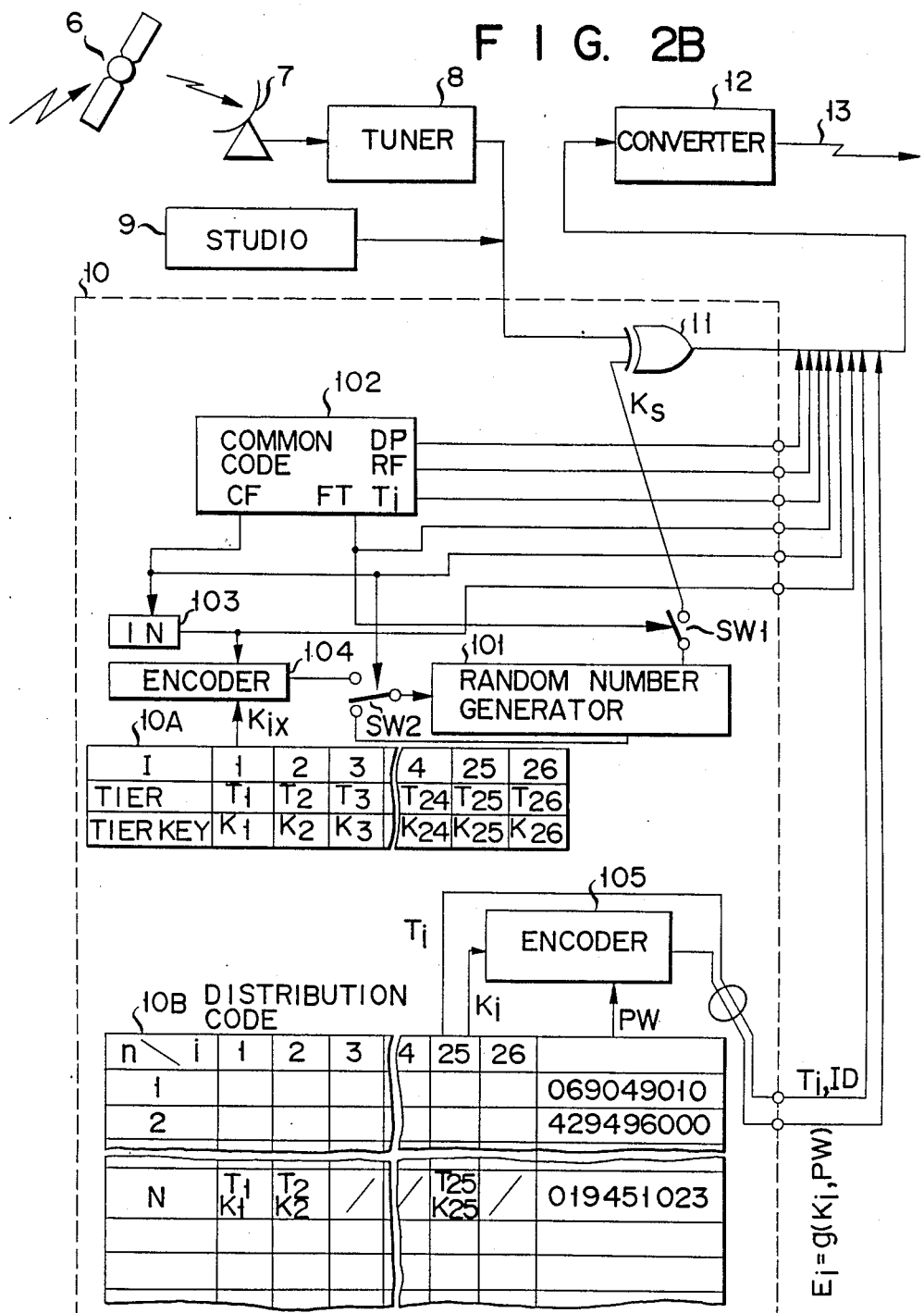

BROADCAST SYSTEM FOR SCRAMBLED PROGRAMMING SIGNALS

BACKGROUND OF THE INVENTION

The present invention relates to a transmitter/receiver for scrambled signals and, more particularly, to a transmitter/receiver for scrambled signals in radio or cable broadcasting systems in which only specific subscribers can view the contracted programs.

The CATV systems, for example, has developed for distibuting mainly TV programs. Recent demands in this field, however, involve qualified and varied services revolving around the transmission of sounds of high fidelity and data in addition to the TV program. A desirable system for satisfying such demands is a pay program system in which a viewer selects special program services according to his taste or desire and pays the broadcasting or cablecasting station for program services for his viewing or hearing. Accordingly, the subscribers are categorized into two types, one is a general subscriber, and the other is a special subscriber who desires such qualified and varied services.

In a broadcasting system based on the pay program system, it is necessary to scramble the pay program signal in order to prevent the general subscribers from viewing or hearing the pay program. Conversely, the key data to descramble the scrambled program must be given to the special subscribers so as to ensure that the special program services reach the special subscribers.

A prior art pay program system is disclosed in Japanese Publication No. 57-30438 (U.S. application Ser. No. 160985). In this system, the key data is scrambled two times, that is, the key data is scrambled again by other key data. Further, in this system the scrambled key data is sent to the special subscribers. The scrambled key data is decoded by the contracted subscriber's unit so as to descramable the pay program. As described above, the ability to enhance the secrecy of the pay program and the key data is improved in such a system. However, further improvements in the ability to enhance the secrecy of the pay program and the key data is further demanded. For this purpose, the present inventor hereby proposes to alter the contents of the key data in a periodical manner.

The alteration of the key data involves rewriting the data in a random access memory (RAM) of the subscriber's processing unit. In this approach, however, another problem arises in that during the transition period used for rewriting the key data, the previous key data is invalidated by the station, and new key data is written into the RAM. In this case, although some of the subscribers have contracted with the station for viewing the program, they fail to view the program. This problem occurs when there are a great number of contracted subscribers and it takes an overly long time for the station to rewrite the key data of each subscriber. Furthermore, a subscriber who contracts immediately after the station replaces the old key data with new data fails to view the program when he first powers on his processing unit.

SUMMARY OF THE INVENTION

Accordingly, an object of the present invention is to provide a transmitter/receiver for scrambled signals in which, even if the key data for descrambling the scrambled signal is altered, the contracted subscriber can be assured of the viewing and hearing of the pay program.

According to one aspect of the present invention, there is provied a transmitter for a scrambled signals unit which transmits a scrambled signal and information for descrambling said scrambled signal. Key information in the descrambling information is stored in a memory means in a receiver. The receiver comprises means for generating a scrambling signal to scramble a program signal, scrambled signal producing means which receives both said program signal and said scrambling signal for producing said scrambled signal, converter means for receiving and converting said scrambled signal into a transmitting signal, initial value signal generating means for generating an initial value signal, said initial value signal being altered in a given manner, means for supplying to said scrambling signal generating means said initial value signal to set up a scrambling mode, key information generating means for generating said key information to descramble said scrambled signal and for supplying it to said converter means, and means for supplying to said converter means a control signal specifying the altering of said initial value to those of said memory means from which said key information is read out and in which said key information is written.

According to another aspect of the present invention, there is provided a receiver for signals on a scramble unit which receives a scrambled signal and information relating to descrambling of said scrambled signal. This receiver comprises demodulating means for demodulating a transmitting signal, descrambling signal generating means for generating a descrambling signal to descramble the scrambled program signal, descrambled signal producing means for receiving both said scrambled program signal and said descrambling signal for producing the descrambled program signal, a plurality of memory means for storing key information which specifies different descrambling modes of said descrambling signal generating means, first selecting means for selecting one memory area from said plurality of memory areas in response to a distribution page flag separated from said descrambling information, said one memory area being a memory area into which first key information is to be written, second selecting means for selecting one memory area from said plurality of memory areas in response to a reference page flag separated from said descrambling information, said one memory area being a memory area from which second key information is read out, means for supplying said second key information to decoding means in response to said reference page flag, and means for supplying to said descrambling signal generating means a decoded signal supplied from said decoding means.

BRIEF DESCRIPTION OF THE DRAWINGS

FIGS. 2A, 2B and 2C are block diagrams of a CATV system to which the present invention is applied.

DETAILED DESCRIPTION OF THE PREFERRED EMBODIMENTS

Figure 1:
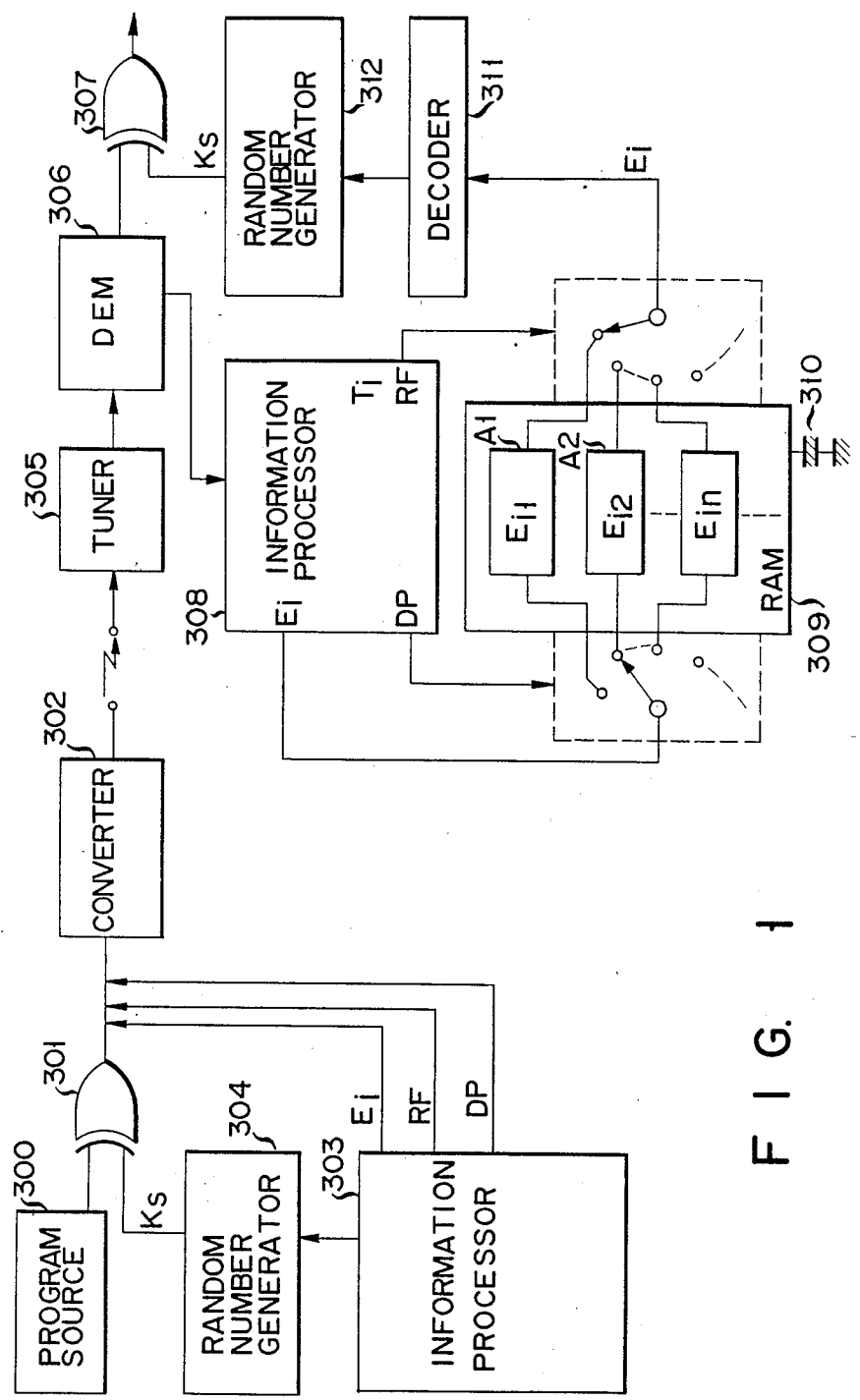
FIG. 1 is a block diagram illustrating an embodiment of the present invention.

A pay program signal derived from a program source 300 is supplied to a scramble means made up of an exclusive OR circuit 301. The scramble means scrambles the pay program signal and applies it to a converter 302.

A random number generator 304 generates signal Ks to scramble the program signal. The signal Ks is supplied to the exclusive OR circuit 301. The signal Ks is altered in its content to change a scramble mode in a periodical manner. The random number generator 304 may be a shift register of an M series. When its initial value is changed, the series of the random signal changes. The period after which to change the scramble mode is, for example, one month.

A transmit information processor 303 supplies key data Ei (hereafter cipher signal) for descrambling the scrambled program signal to converter 302 for sending to customers who pay for the program service under contract, i.e., contracted subscribers. Further, a distribution page flag DP and a reference page flag RF are sent to the subscriber by the transmit information processor 303 via converter 302. The distribution page flap DP designates a memory area in a RAM 309 installed in the subscriber's processing unit. The reference page flag RF designates a memory area storing the cipher signal to be read out at the present time from the RAM 309. In this example the cipher signal Ei1 is read out and the cipher signal Ei2 is written.

The broadcasting signal is received by a tuner 305 and supplied to a demodulator 306. The signal demodulated by the demodulator 306 contains the cipher signal Ei2, the distribution page flag DF and the reference page flag RF, which are sent from the information processor 303. These data are supplied to a receive information processor 308.

The information processor 308 supplies the cipher signal Ei2 to the RAM 309. The memory area A2 of the RAM 309, into which the cipher signal Ei2 is to be stored, is designated by the distribution page flag DP which has been sent together with the cipher signal Ei2. The memory area A1 of the RAM 309, into which the cipher signal Ei1 is to be read, is designated by the reference page flag RF.

The cipher signal Ei1, read out from the RAM 309, is supplied to a decoder 311 to decode an initial value signal. Then, a random number generator 312 is provided with a descramble mode. The random number generator 312 supplies the signal Ks for descrambling the scrambled pay program signal being broadcasted to a descramble means made up of an exclusive OR circuit 307. Then, the descrambled program signal is obtained from the exclusive OR circuit 307.

When the current pay program is changed to the new pay program, and the scramble mode is changed to that based on the cipher signal Ei2, the reference page flag RF designates a memory area A2 of the RAM 309. Then, the cipher signal Ei2 is read out from the memory area A2 and decoded by the decoder 311. At this time, the descrambling signal Ks provides a descramble mode based on the cipher signal Ei2. During the time the key data is used, other key data can be transmitted from the transmit information processor 303. The RAM 309 is connected to a backup power source 310, the use of which ensures that, even if the main power source of the subscriber's processing unit is turned off, the cipher signal stored in the RAM 309 is not rendered volatile.

As described above, the cipher signal necessary for descrambling is previously sent to the subscriber and stored in a memory area as designated by the distribution page flap DP. Whenever the key data of the cipher signal is needed its memory area can be specified by the reference page flag RF. That is, the key data for descrambling at any time is stored in the RAM 309. In other words, when the key data for descrambling is delivered to subscribers, a satisfactory transfer time is secured even if the subscribers are great in number.

FIG. 2 shows a scheme of a broadcasting system to which the present invention is applied.

Figure 2A:
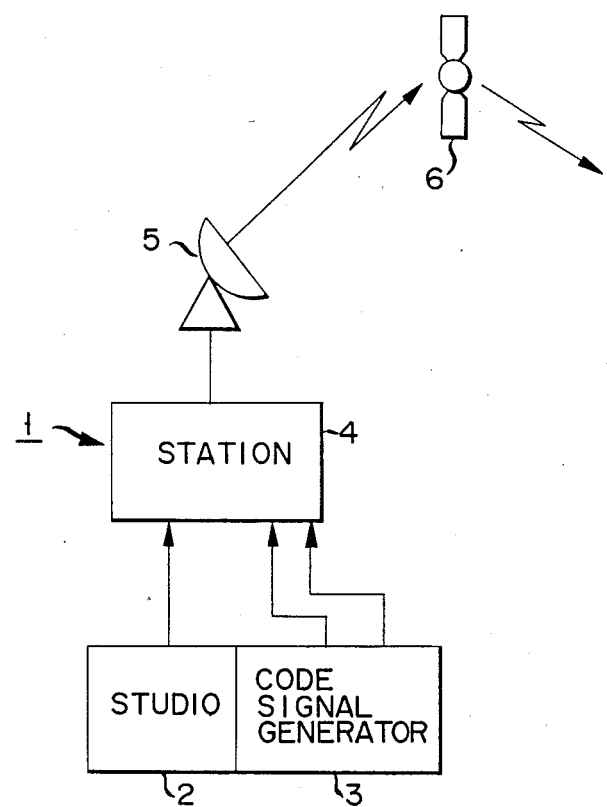

The broadcasting system shown in FIG. 2A can transmit high quality pictures and data over a wide service area by way of a broadcasting satellite. A ground station 1 includes a studio 2 serving as a transfer data source and a code signal generator 3 for generating various types of control signals, including scramble decoding data necessary for descrambling the scrambled signal. The scrambled signal and the scramble decoding data for descrambling are sent to an up-link station 4 and then to an antenna 5. The antenna 5 emits a 14 GHz wave toward a satellite running on a still orbit.

Upon receipt of the 14 GHz wave, the satellite 6, equipped with a repeater, repeats this wave and emits it in the form of a 12 GHz wave toward a satellite station on the ground (FIG. 2B). In the satellite transmission system, when a PCM sound signal is transmitted, a space channel of the television signal band is utilized. In this case, a subcarrier signal (5.72 MHz) with the PCM sound signal is phase modulated on the 4-phase type.

The satellite station receives the wave radiated by the satellite 6 by means of an antenna 7, and supplies its output signal to a tuner 8. The tuner 8 descrambles the scrambled program signal to obtain the original program signal. The satellite station also has a studio 9 and can produce such program signals independently. The program signal is frequency converted by a frequency converter 12 and the signal to be transmitted is sent to the cable 13.

Figure 2C:
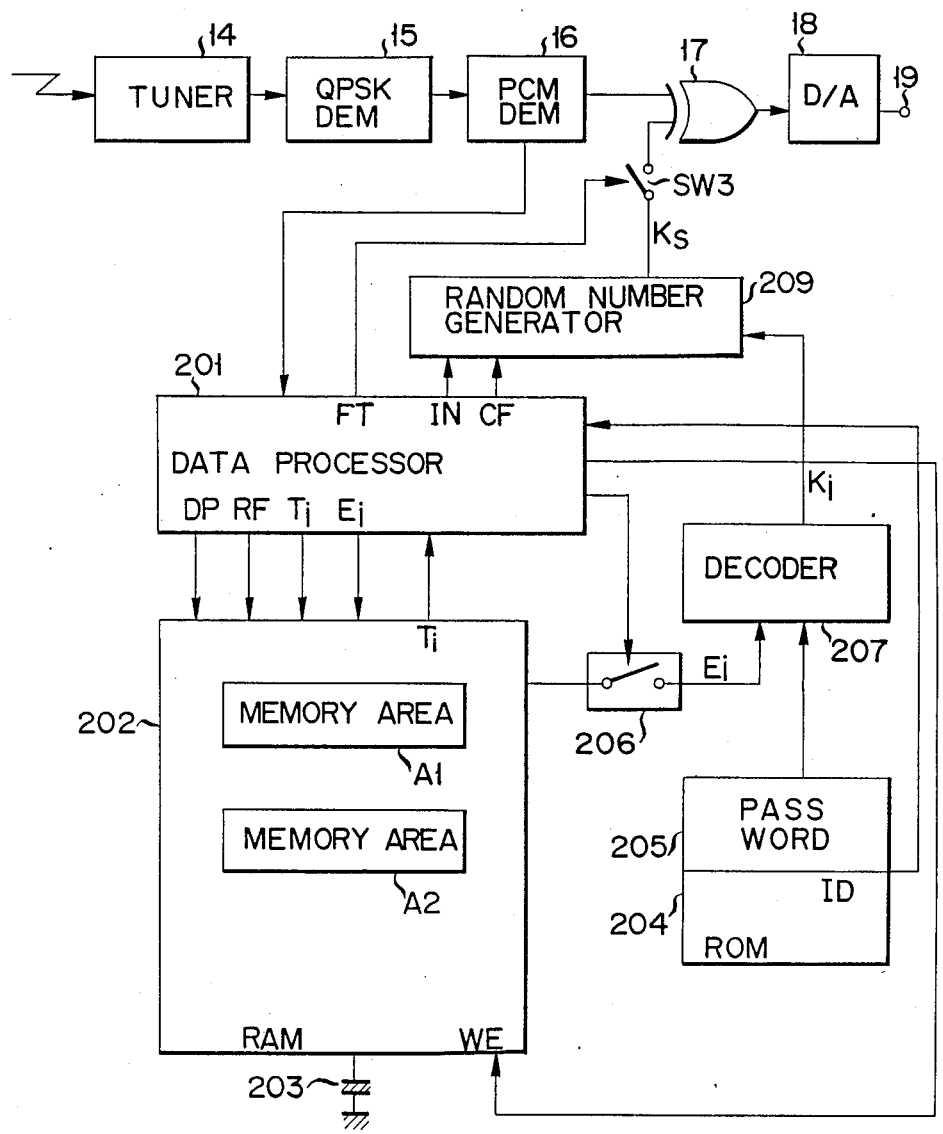

In this case, the pay program signal is scrambled before it is sent. The present invention is applicable for a transmit/receive system for transmitting and receiving the scrambled signal between the ground station 1 and the satellite station. It will be understood that, in this instance, the present invention is applied to a transmit/receive system for transmitting and receiving a scramble signal between a satellite station (FIG. 2B), to be given later, and a subscriber's processing unit (FIG. 2C).

A system for scrambling the program or transmission signal is categorized into two systems, an analog scramble system and a digital scramble system. In the analog scramble system, the analog program signal is directly scrambled. In the digital scramble system, the program signal is digitized, scrambled, and then returned to the analog program signal. To recover the original program signal, irrespective of whether the scramble system employed has been the analog system or the digital system, the descramble process to be used is the reverse of the scramble process, just as is done on the transmitting side.

A pay program system, to be described below, is based on the digital scramble system in which the transmission signal is digitally scrambled.

For transmitting the pay program based on the digital sound signal, scramble data is added to program data for scrambling. The scrambled program must be viewed by only the subscriber who made a contract with the broadcasting station on paying for viewing the program, and it must reject its being viewed by the uncontracted or no-pay subscriber. Therefore, to enable the contracted subscriber alone to view the pay program, it is necessary to send the cipher signal for descrambling to the contracted subscribers.

In FIG. 2B, the program prepared by the studio 9 is the pay program. The program signal is scrambled by a scramble means made up of an exclusive OR circuit 11 in a code signal generator 10. The scrambled program signal is frequency converted into a signal of a predetermined frequency by a frequency converter 12, and it is then sent to the subscriber's processing unit (FIG. 2C). A random number generator 101 generates a signal Ks to scramble the program signal. The signal Ks is supplied to the exclusive OR circuit 11 through a switch SW1. The random number generator 101, which is for generating pseudo-random noise, may be a shift register of the M series.

When an initial signal of the random number generator 101 is changed, a generating mode of the signal Ks is altered. This means that the scramble mode itself is altered. Means for altering the scramble mode is comprised of a common code transmitter 102, an initial code circuit 103, a tier key processing unit 10A, an encoder 104 and a switch SW2. The common code transmitter 102 generates a change flag CF, a free tier flag FT, a distribution page flag DF, a reference page flag RF and a tier Ti. These flags CF, FT, DF and RF, and the tier Ti, are called a common code and are supplied to the frequency converter 12 to be transmited to all subscribers. Further, the change flag CF is supplied to the initial code circuit 103 and a control terminal of the switch SW2. The tier Ti (hereafter the current tier Ti) is a code designating the broadcasting program of the present time. The use of the flags, FT, DF and RF will be described later.

In the tier key processing unit 10A, for example, the tier Ti ($i=1\sim26$) and the tier key Kix ($i=1\sim26$) corresponding to the tier, are shown. The tier key Kix is a code specifying a program. Each number ($i=1\sim26$) indicates a program. When the program 1 is broadcasted, the tier key Kix ($i=1$) (hereafter the current tier key Kix) is used. Further, the contents of the tier key Kix ($i=1$) are changed every month, thereby enhancing secrecy of the scrambled signal. When the contents of the tier key Kix ($i=1, x=1\sim12$) are altered ($x=1\sim12$ refers to each month), the initial signal is altered too, according to the change flag CF.

When the change flag CF is supplied to the initial code circuit 103, an initial code of the initial code circuit 103 is altered. The initial code is encoded with the current tier key Kix from the tier key processing unit 10A by the encoder 104. An output initial signal from the encoder 104 is supplied to the random number generator 101 through the switch SW2, as selected in the encoder 104 by the change flag CF. After the initial signal is sent to the random number generator 101 a loop formed by the random number generator 101 and the switch SW2, is created, and the generating mode of the random number is determined. Accordingly, the secrecy of the scrambled signal is furthr enhanced. The change flag CF is utilized as a synchronizing signal for altering the scramble mode. The free tier flag FT is used for determining whether the operation of scrambling is started or stopped by the controlling of the switch SW1, ON and OFF.

The distribution page flag DF indicates a distribution page memory area A1 or A2, as shown FIG. 2C. The distribution page memory area A1 or A2, indicated by the distribution page flag DF, is to be written as an area cipher signal $Ei=g$ (kix, PW). The distribution page memory areas A1, A2 and the cipher signal $Ei=g$ (Kix, PW) are considered in more detail subsequently. The reference page flag RF indicates the distribution page memory area A1 or A2 which is to be read out and memorized as the cipher signal Ei.

Further, in the code signal generator 10, a distribution code transmitter 10B is provided. The distribution code transmitter 10B prepares a tier Ti (hereafter the reserved tier Ti), an identification signal ID, a tier key Kix (hereafter the reserved tier key Kix) and a password PW. In the distribution code transmitter 10B the number ($i=1\sim26$) represents programs which can be contracted for viewing by the subscribers. The number ($n=1\sim N$) indicates the contracted subscribers.

When the scrambled program signal, whose scramble is based on the current tier key Kix, is transmitted to the contracted subscriber, the reserved tier key Kix is required to decipher the scrambled signal to obtain a descrambled program signal. To give the reserved tier key Kix to the contracted subscriber, the reserved tier key Kix is transmitted to the contracted subscriber in the following manner.

The tier key Kix is combined with the password Pw by encoder 105 to enhance the secrecy of the tier key Kix. Then, the encoder 105 obtains the cipher signal $Ei=g$ (kix, PW)., When the cipher signal Ei is output, the tier Ti and the identification signal ID are transmitted together with the cipher signal Ei. The cipher signal Ei, the tier Ti and the identification signal ID are called a distribution code and are used to descramble the scrambled program signal. These are supplied to the frequency converter 12.

The identification signal ID designates the contracted subscriber's processing unit, and the reserved tier Ti is the code of a program contracted by a subscriber. The password PW is used to decode the tier key Kix in the subscriber's processing unit in FIG. 2C.

In FIG. 2C, the subscriber's processing unit receives the broadcasting signal at the tuner 14 and demodulates it with a QPSK demodulator 15 and a PCM demodulator 16. If scrambled, the program signal demodulated by the PCM demodulator 16 is descrambled by an exclusive OR circuit 17, since a descrambled signal Ks is supplied from a random number generator 209 to the exclusive OR circuit 17 through a switch SW3. The cipher signal Ei, the reserved tier Ti and the identification signal ID, which are demodulated by the PCM demodulator 16, are supplied to a data processor 201. Further, the distribution page flag DF, the reference page flag RF, the change flag CF, the free tier flag FT and the current tier Ti are also supplied to the data processor from the PCM demodulator 16.

When the identification signal ID, as sent from the satellite station, is coincident with the identification signal ID of the contracted subscriber, the cipher signal Ei is written into the RAM 202. The identification data ID of the subscriber is stored in an address code circuit 204 made up of a ROM.

The RAM 202 has a plurality of memory areas (in this embodiment, two memory areas A1 and A2). The memory area into which the incoming cipher signal Ei is written is determined by the contents of the distribution page flag DP. Thus, the cipher signal Ei and the reserved tier Ti for descrambling the pay program signal are stored into the RAM 202 of the subscriber who pays for viewing the pay program.

The reference page flag RF is used to specify the memory area of the RAM 202 from which the desired cipher signal is read out. How to descramble the scrambled signal by using the key data as the cipher signal stored in the RAM 202, will now be described.

The current tier Ti is compared with the reserved tier Ti stored in the memory area specified for reading out. The coincidence of the current tier Ti with the stored tier Ti implies that the program associated with the current tier Ti is that contracted by the subscriber paying for viewing the program. Upon coincidence of these tiers, switching circuit 206 is closed. The cipher signal Ei=(Kix, PW) is read out from the RAM 202 and applied to a decoder 207. In the decoder 207, the password of the contracted subscriber is, for example, subtracted from the cipher signal Ei. Thereby the reserved tier key Kix, which is the same as the current tier key Kix, is decoded.

To decode the tier key Kix a password assigned to the contracted subscriber is used. The coincidence of the password contained in the tier key Kix with that contained in a password ROM 205 confirms that the subscriber has made a contract with the cablecasting station for viewing that program.

The tier key Kix of the decoder 207 is supplied to a random number generator 209. Further, the initial signal IN from the data processor 201 is supplied to the random number generator 209. Accordingly, a generating mode of the random number of the random number generator 209 is determined to be the same as that controlled by the random number generator 101 (FIG. 2B). Similarly, the descramble signal Ks generated by the random number generator 209 is the same as the scramble signal Ks generated by the random number generator 101 in FIG. 2B. Consequently, the exclusive OR circuit 17 produces the descrambled pay program signal. When the program signal is not the pay program, the free tier flag FT cuts off the switch SW3.

In the embodiment under discussion, to enhance the secrecy of the scramble, the distribution code, e.g., the tier key Kix, is changed every month as is the cipher signal Ei. To cope with this, the contracted subscriber must previously store in his RAM 202 the cipher signal Ei to be used in the next month. When the key data is previously stored the memory areas A1 and A2 of the RAM 202, the distribution page flag DP and the reference page flag RF may be used effectively.

Figure 3:
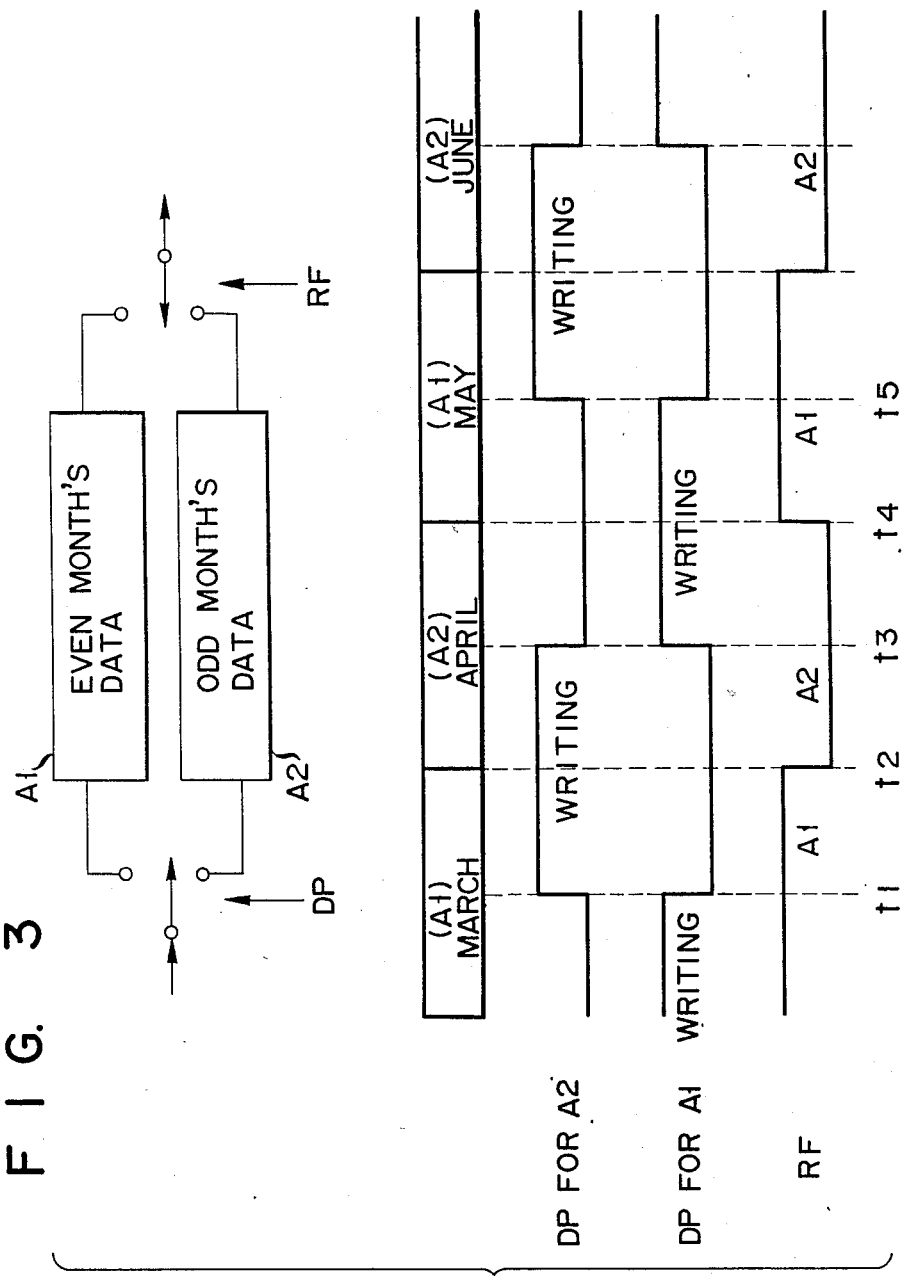
FIG. 3 shows a block diagram and a set of waveforms which are useful in explaining the operation of the circuit shown in FIG. 2.

The distribution page flag DP specifies the memory area, A1 or A2, into which the cipher signal containing the tier key Kix and the password is to be written. The reference page flag RF specifies the memory area, A1 or A2, from which the cipher signal is to be read out. Accordingly, the cipher signal stored in the memory area A1 is referred to in odd numbered months, while that in the memory area A2 is referred to in even numbered months. This may be implemented by a configuration as shown in FIG. 3, for example.

The memory areas A1 and A2 are continuously placed in a write mode for writing the cipher signal during a period from the middle of the previous month, before a certain tier key is used, till the middle of the month in which the tier key is being used. For example, the memory area A2 is placed in a write mode by the distribution page flag DP during a period from mid-March to mid-April. The data in the memory area A2 is used in April. The memory area A2 is placed in a state to accept for reading in of the cipher signal during mid-April to mid-May. The data of the memory area A1 is used in May, with reading out done by the reference page flag RF. In the instance illustrated, at high level "1" of the flag RF, the memory area A2 is specified to allow the data to be read out therefrom. At low level "0", the data is read out of the memory area A1.

The related data used in April has been stored in the memory area A2 during the period t1 to t3, i.e., from mid-March to mid-April. It is during the "0" level period from t2 to t4 of the reference page flag RF in April that the data in the memory area A2 is actually used.

The related data used in April is continuously transmitted during the period from t2 to t3, about half the month of April. This fact implies that if the subscriber contracts with the broadcasting station, paying to view a program as the month changes from March to April, the contracted subscriber never fails to view the contracted program.

The same situation applies to the transmission and storage of the cipher signal used in odd numbered months. For example, the cipher signal used in May is transmitted during the period t3 to t5, i.e., from mid-April to mid-May. During the period from t3 to t5, the distribution page flag DP designates the memory area A1. Then, the cipher signal used in May is stored in the memory area A1.

As seen from the foregoing, if the data is written into the memory area A1 from mid-April, the contracted subscriber can view the program without any trouble because the cipher signal used in April is read out from the memory area A2. The cipher signal of the memory area A1 for use in April is held till mid-May. That is, the memory area A1 will be then specified by the distribution page flag DP. The RAM 202 is connected to a backup power source 203, the use of said backup power source ensuring that, even if the main power source of the subscriber processing unit is temporarily stopped early in May, for example, the related data stored in April is never volatilized.

As mentioned above, the two memory areas A1 and A2 are alternately used for each month; however, the number of memory areas may be increased. For example, if twelve memory areas are used, the cipher signals of one year are respectively assigned to and stored in the twelve memory areas. In this case, the memory area specified by the reference page flag RF may be designated by the cablecasting station. This results in further enhancing the secrecy of the related data used. Additionally, the distribution page flag DP and the reference page flag RF may be contained in the related data and, as such, may be sent as a distribution code to the contracted subscribers alone.

What is claimed is:
1. A transmitter for a scramble unit which transmits a scrambled program signal and encoded key information used to descramble said scrambled program signal at a receiver, comprising:
random number generating means for generating a scrambling signal to scramble a program signal;
means for receiving said program signal and said scrambling signal for generating said scrambled program signal;
initial value signal generating means for generating and supplying an initial value signal to said random number generating means;
encoding means for encoding said initial value signal and for generating said encoded key information to be used for descrambling said scrambled program signal;

converter means for frequency-converting said scrambled program signal and said encoded key information into a transmission signal;

means for transmitting to said receiver a distribution page flag specifying in which memory region of a memory provided at said receiver said encoded key information is to be stored and for transmitting to said receiver a reference page flag specifying from which memory region of said memory said encoded key information is to be read out in order to descramble said scrambled program signal at said receiver.

2. The transmitter according to claim 1, wherein said initial value signal generating means comprises:
a code processing unit for storing a code specifying a program;
an initial code circuit for generating an initial code;
change flag generating means for generating a change flag for determining the time of changing said initial value;
encoder means for receiving and encoding said program-specifying code and said initial code; and
a switch for supplying an output of said encoder means as said initial value signal in response to said change flag.

3. The transmitter according to claim 2, wherein said program-specifying code is altered every month.

4. The transmitter according to claim 2, wherein said initial code circuit alters said initial code in response to said change flag.

5. The transmitter according to claim 1, wherein said encoding means encodes a code specifying a contracted program and a password of a contracted subscriber to produce said encoded key information.

6. The transmitter according to claim 1, wherein said encoding means further generates an identification signal specifying a contracted subscriber and generates a contracted program code for frequency-converting by said converter means.

7. A descrambling circuit which receives a scrambled program signal and encoded key information from a transmitter for descrambling said scrambled program signal, comprising:
a data processor for discriminating a distribution page flag and a reference page flag which are transmitted from said transmitter, said distribution page flag specifying in which one of a plurality of memory regions said encoded key information is to be stored, and said reference page flag specifying from which one of said memory regions previously transmitted encoded key information is to be read out;
memory means including the memory region specified by said data processor for storing said encoded key information;
a decoder for receiving and decoding said encoded key information from said memory region specified by said reference page flag;
a random number generator having an operational sequence equivalent to an encoding sequence executed at said transmitter, said random number generator using said decoded key information as an initial value for generating a random number necessary to descramble said scrambled program signal; and
a descrambling means receiving said random number from said random number generator and said scrambled program signal for descrambling said scrambled program signal.

8. A descrambling circuit according to claim 7, wherein said plurality of memory regions include a first memory area from which data is read out in odd numbered months, and a second memory area from which data is read out in even numbered months;
said data processor selects said first memory area during a period from the middle of one of said odd numbered months to the middle of the even numbered month succeeding said odd numbered month for writing said encoded key information into; and
said data processor selects said second memory area during a period from the middle of one of said odd numbered months t the middle of the even numbered month succeeding said odd numbered month for reading said previously transmitted encoded key information therefrom.

9. The descramble processing circuit according to claim 7, wherein said plurality of memory regions are located in a RAM coupled to a backup power source.

10. A system for broadcasting a scrambled program signal in which a scrambling means for receiving a program signal to be scrambled and an output of a random number generator for scrambling said program signal, an initial key generating means for generating and supplying an initial key to said random number generator, and an encoding means for encoding said initial key to provide an encoded key for a subscriber are disposed in a transmitter which causes a frequency converter to frequency-convert said scrambled program signal and said encoded key to a predetermined frequency, said frequency-converted, scrambled program signal and encoded key being transmitted by said transmitter for reception by each subscriber's receiver for decoding said transmitted encoded key so as to reproduce said initial key and descramble said transmitted, scrambled program signal using a random number obtained by applying said reproduced initial key to a random number generator provided at each of said receivers and having a random number generating sequence equivalent to that of said random number generator provided at said transmitter, said scramble broadcasting system comprising:
common-code generating means provided at said transmitter for generating a common code to be commonly transmitted to all subscribers of said broadcasting system;
memory means provided at each of said receivers for storing said encoded key; wherein:
said broadcasting system transmits to each of said receivers as said common code a distribution code for specifying into which memory region of said memory means said encoded key is to be stored, a reference page code for specifying from which memory region of said memory means said encoded key is to be read out at the time said descrambling is executed, and for selecting the memory region of said memory means which is specified by said reference page code so as to descramble said scrambled program signal, thereby preventing unauthorized access to said broadcasting system.

* * * * *